L. L. THURSTONE.
ART OF PROJECTING CONTINUOUS PHOTOGRAPHIC PICTURES.
APPLICATION FILED OCT. 12, 1908.
943,326.
Patented Dec. 14, 1909.
4 SHEETS—SHEET 1.
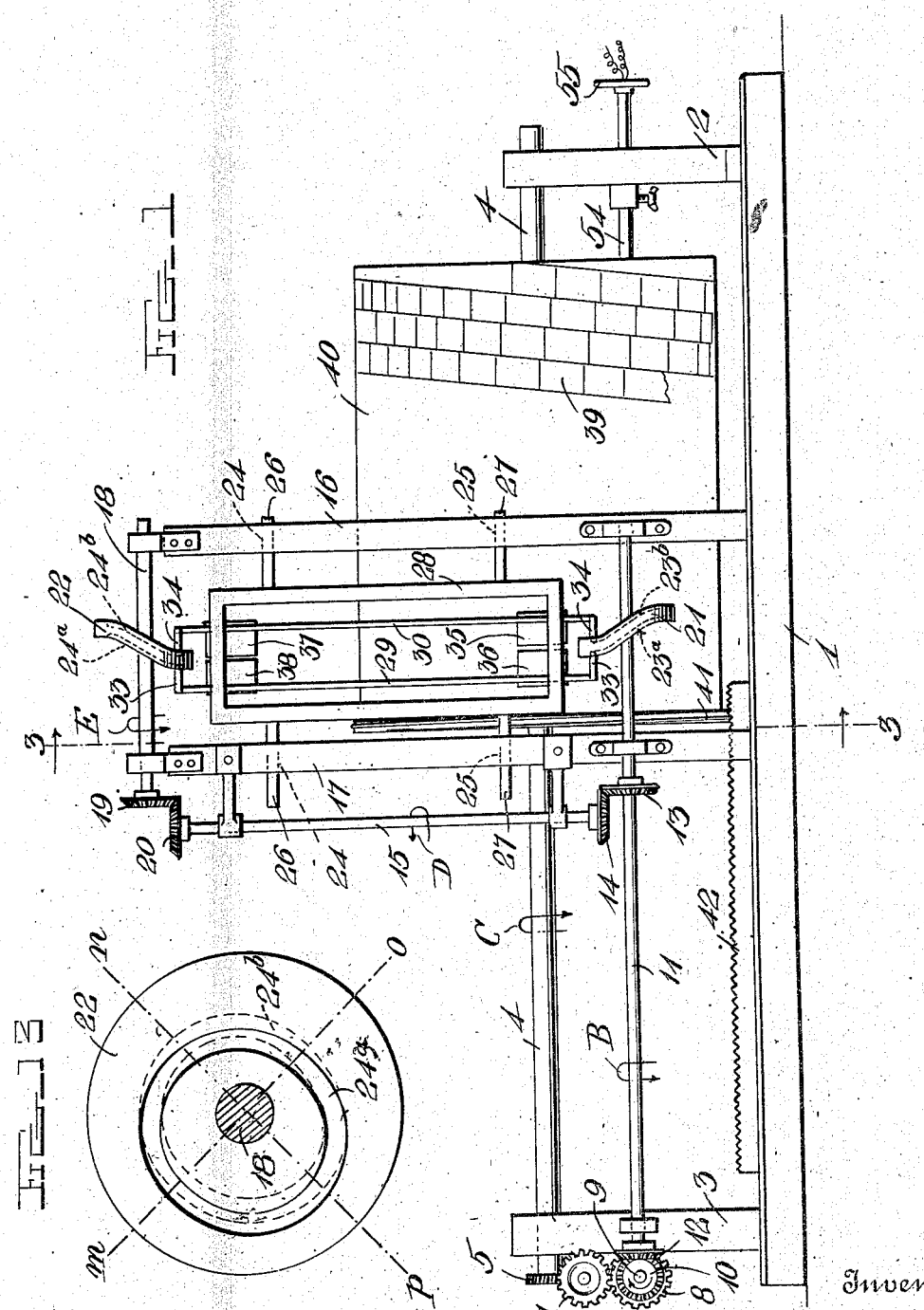
Witnesses
C. H. Griesbauer
Inventor
L. L. Thurstone
By H. B. Willson & Co.
Attorneys

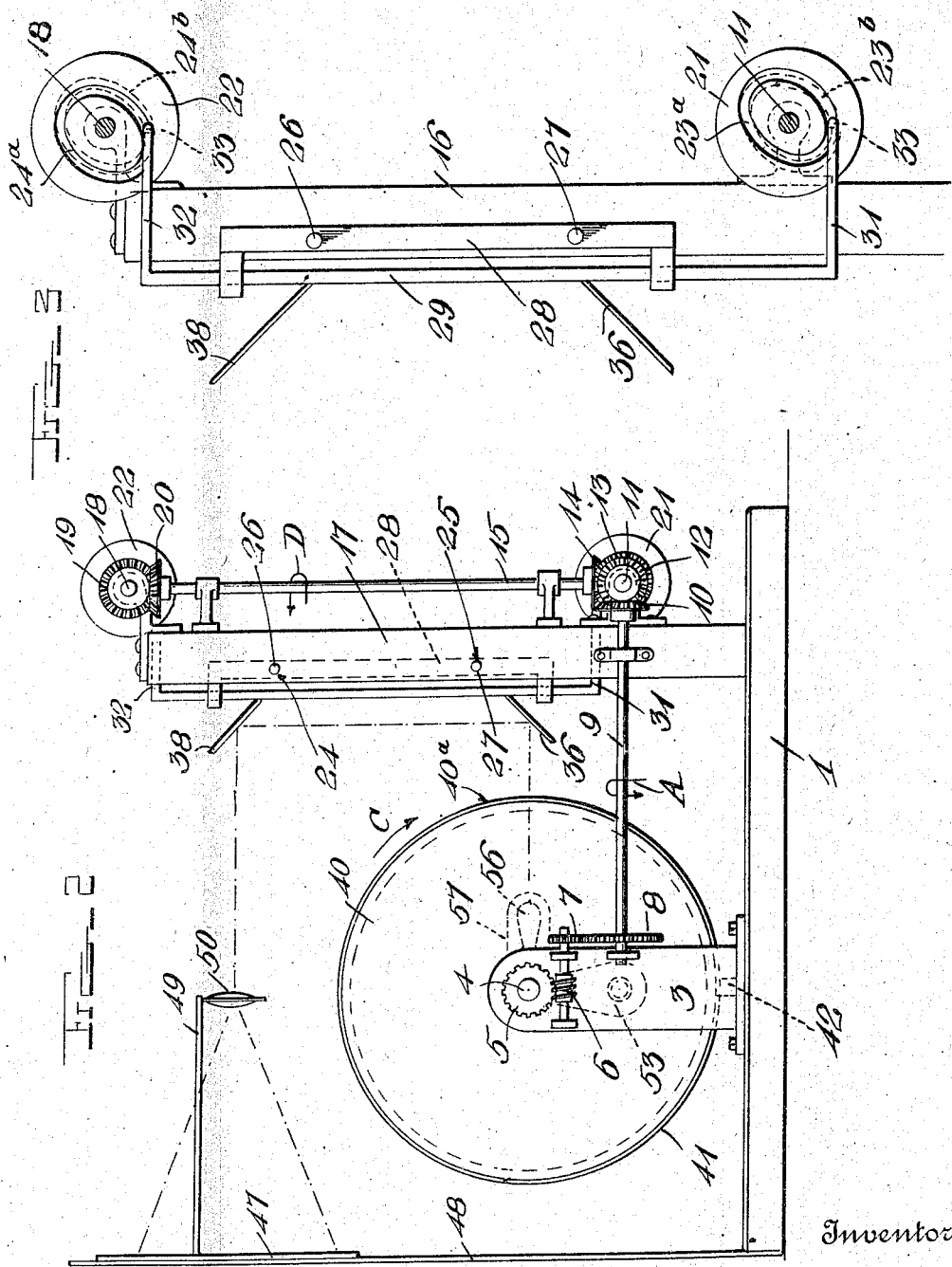

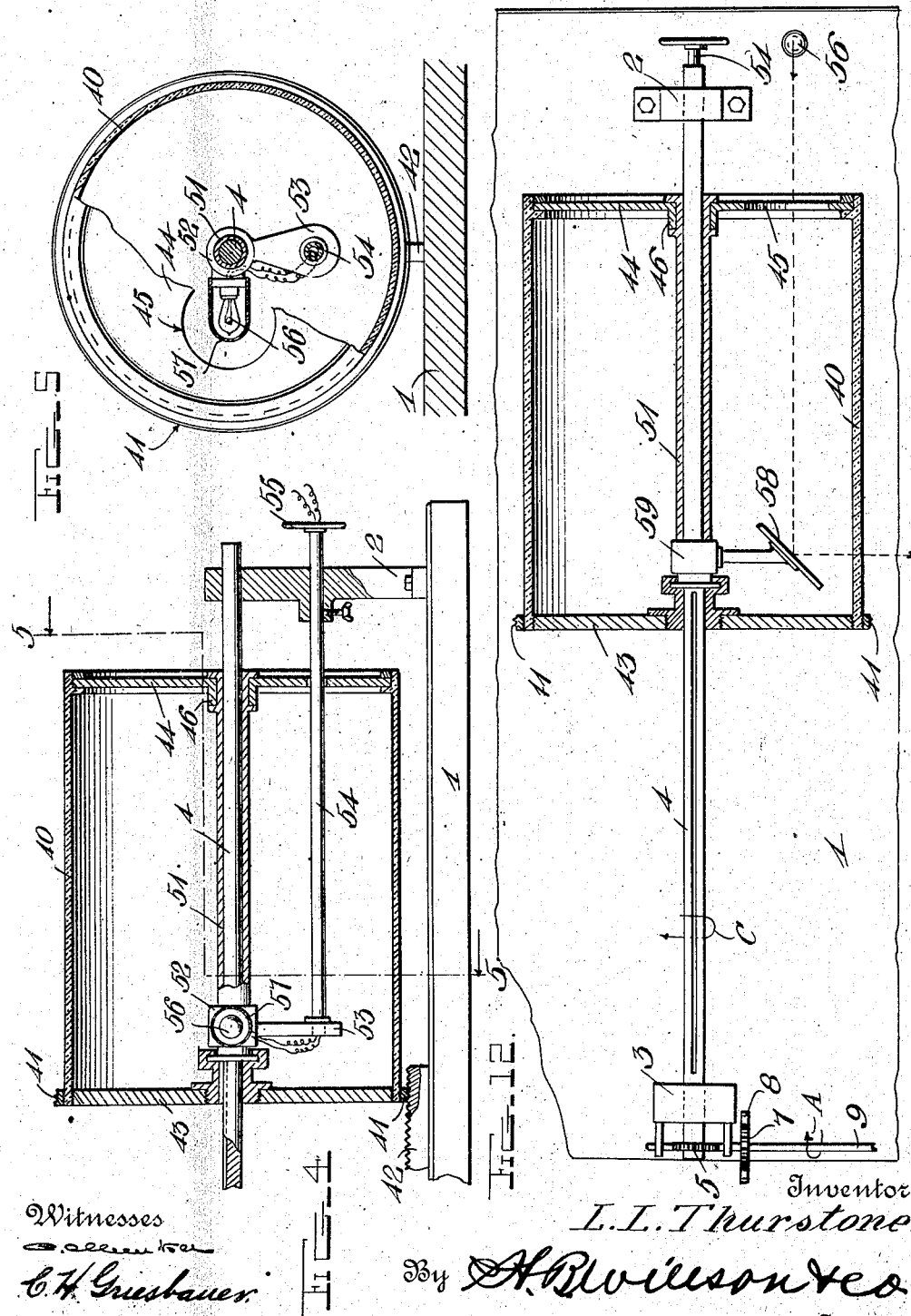

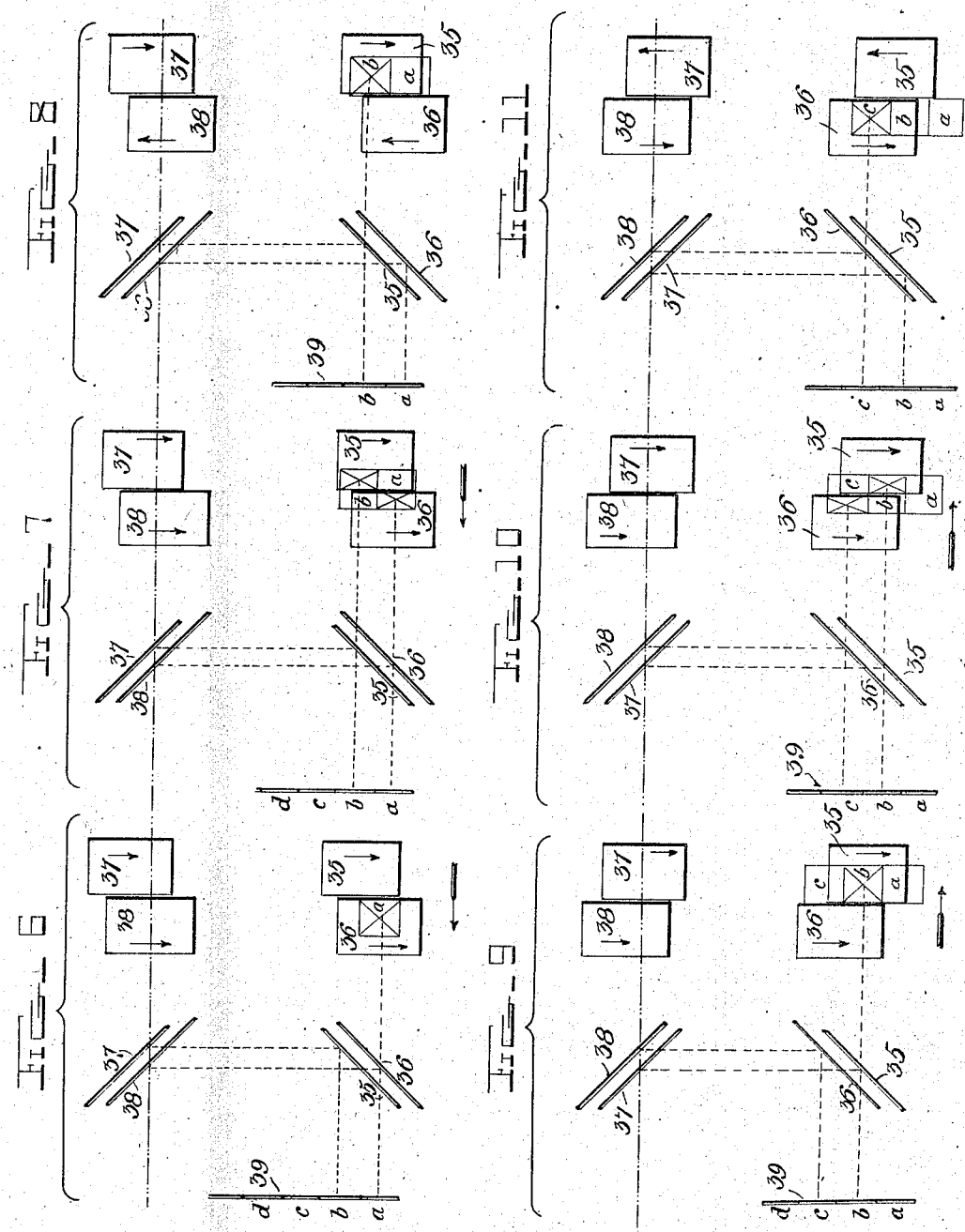

UNITED STATES PATENT OFFICE.

LOUIS LEON THURSTONE, OF JAMESTOWN, NEW YORK.

ART OF PROJECTING CONTINUOUS PHOTOGRAPHIC PICTURES.

943,326.  Specification of Letters Patent. Patented Dec. 14, 1909.

Application filed October 12, 1908. Serial No. 457,329.

*To all whom it may concern:*

Be it known that I, LOUIS LEON THURSTONE, a citizen of the United States, residing at Jamestown, in the county of Chautauqua and State of New York, have invented certain new and useful Improvements in the Art of Projecting Continuous Photographic Pictures; and I do declare the following to be a full, clear, and exact description of the invention, such as will enable others skilled in the art to which it appertains to make and use the same.

This invention relates to a new art of projecting continuous pictures from a film or tape or other photographic record upon a screen without producing any flickering of the light projected on the screen or a blurred effect of the pictures projected.

One of the objects of this invention is the production of means for optically projecting continuous photographic images without the use of a shutter.

Another object of this invention is the production of means for optically projecting continuous photographic images upon a screen involving a uniform movement of the photographic record carrying the photographic images.

Another object is the production of a new art of projecting continuous photographic images comprising means for rapidly and successively reflecting photographic images in such a manner that the light rays in the pictures will not be intermittently broken during the projecting process.

Another object of this invention is the production of means for rapidly and successively reflecting continuous photographic images without the aid of a shutter in such a manner that the light rays and the picture will be projected upon the screen without being intermittently broken.

Another object of the invention is the production of a cylindrical record for carrying continuous photographic images so arranged that the images projected from the record will appear upon a distinct screen in perfect continuity.

Another object of the invention is the production of a record helically mounted upon a transparent cylinder and adapted to be spirally rotated upon a shaft.

Another object of the invention is the production of a cylindrical record support formed of transparent material and provided with a cylindrical record carrying photographic images arranged helically and continuously on the record.

Another object of the invention is the production of reflecting means adapted to perform the function of a photographic shutter provided with means for automatically adjusting the same and adapted to accurately project continuous photographic images upon a distant screen.

Another object of the invention is the production of a projecting mechanism provided with a screen mounted on the mechanism.

Another object of the invention is the production of a projecting mechanism for projecting continuous photographic images provided with means for guiding the movement of the photographic record in such a manner that the photographic record is subject to substantially no wear.

Another object of the invention is the production of a machine for projecting continuous photographic images on a screen capable of being conveniently used in homes, lecture rooms and for general educational purposes.

With these and other objects in view, the invention consists of certain novel features of construction, combination and arrangement of parts, as will be more fully described and particularly pointed out in the appended claims.

Figure 1 is a rear elevation of the preferred mechanism I employ in carrying out my invention; Fig. 2 is an end elevation; Fig. 3 is a detail side elevation of the mirror mechanism. Fig. 4 is a longitudinal sectional view through the cylinder and adjacent parts. Fig. 5 is a vertical sectional view taken on line 5—5 of Fig. 4. Fig. 6 is a diagrammatical view of the reflecting mirrors showing one set of the mirrors in position to reflect one complete image; Fig. 7 is a similar view showing one set of mirrors being removed out of the reflecting position and another set of mirrors being moved into reflecting position; Fig. 8 is a similar view showing a set of mirrors occupying the reflecting position in Fig. 6 being moved to an elevated position and the remaining set of mirrors shown in a position to reflect one complete image; Fig. 9 is a similar view showing the image thrown upon the reflecting mirrors indicated in Fig. 6 moved out of the light path and the set of mirrors shown in the reflecting position in Fig. 8 being moved out of the light path and the remaining set of mirrors being moved into the light path; Fig. 10 is a similar view showing the reflecting set of mirrors indicated in Fig. 6 reflecting one-half of one image and the remaining set reflecting the remaining half of the image; Fig. 11 is a similar view showing the reflecting set of mirrors indicated in Fig. 6 reflecting a complete image and the remaining set of mirrors in position to be elevated so as to reflect a succeeding image; Fig. 12 is a detail horizontal view of a modified method of reflecting continuous images; and Fig. 13 is a plan view of a cam on an enlarged scale.

Corresponding and like parts are referred to both in the drawings and in the following description by similar reference characters.

In the accompanying drawings, which are for illustrative purposes and therefore not drawn to scale, is shown a pattern of the machine particularly designed to be used in projecting continuous photographic images before small gatherings. It is understood that the invention as finally embodied in a structure that will be placed on general sale will differ from the machine illustrated in many respects but all of the machines that will be placed on the market, will of necessity follow the general lines of my invention as illustrated in the accompanying drawings and in the following description.

In the present types of machines in current use, the photographic images are carried on a continuous film or tape which is usually formed with side perforations and movable across a toothed wheel. In these machines, the light is intermittently broken by means of various types of shutters and the images as they are projected upon the screen become blurred and frequently the film breaks causing the machine to be abruptly stopped. In these machines, the wear of the record is excessive and the appearance of the images as they are projected on the screen is very imperfect owing to the intermittent breaking of the light rays carrying the projected images.

I have discovered that it is possible to substitute for the present imperfect and unsatisfactory shutter method of projecting continuous photographic images, a mirror reflecting method which may be applied for projecting pictures carried by the ordinary film or may be applied for projecting pictures from especially designed cylindrical records. The present invention relates to the means I employ in carrying out the principle of my discovery.

In the accompanying drawings, numeral 1 indicates the base of my machine and 2 and 3 indicate shaft supporting standards which are positioned on opposite ends of said base. A shaft 4 is rotatably mounted on the standards 2 and 3 and provided at one of its ends with a gear wheel 5. The gear wheel meshes with a worm gear 6 rotatably mounted on extensions formed on the standard 3 and the shaft of said worm gear is provided with a gear wheel 7 which meshes with a second gear wheel 8 mounted on a horizontal shaft 9. The shaft 9 extends across one end of the base 1 and is provided on one of its ends with a gear wheel 10. A shaft 11 rotatably supported on base 1 by a suitable standard extends longitudinally of the base and parallel with shaft 4 but slightly lower than the same and engages with shaft 9 by means of beveled gear 12 adapted to mesh with beveled gear 10 and said shaft is provided with a second beveled gear 13 adapted to mesh with a horizontally mounted beveled gear 14 carried by a shaft 15.

At a point intermediate of the ends of the base 1, a supporting frame comprising standards 16 and 17 extends above said base and carries the reflecting mechanism, and the reflector shifting mechanism. A shaft 18 is rotatably mounted on the upper ends of the standards 16 and 17 and is provided with a beveled gear 19 adapted to mesh with a second beveled gear 20 formed on the upper end of the shaft 15. The shafts 11 and 18 are provided with cams 21 and 22 which are rigidly mounted on said shafts and arranged to move thereon at a point nearly mid-way of the standards 15 and 16.

The cams 21 and 22 are oppositely curved in cross section so that one-half of each cam will occupy a different plane from the other half and each side of the cams is formed with eccentric cam grooves 23$^a$, 23$^b$, 24$^a$ and 24$^b$. The cams 21 and 22 are disposed on the shafts 11 and 18 so that the upwardly facing end of one cam will aline with the downwardly facing end of the other cam. The standards 16 and 17 are formed with a plurality of transverse openings 24 and 25 through which pins 26 and 27 are arranged to slidably move. The pins 26 and 27 support a frame 28 which carries the reflecting mirrors or mechanism, said frame being formed rectangular and adapted to be guided by means of pins 26 and 27 on the standards 16 and 17 and moved by being operatively connected with the rotatable cams 21 and 22.

The rectangular frame 28 carries a plurality of vertically disposed bars 29 and 30 which are formed with inwardly bent arms 31 and 32. The arms 31 and 32 of the bars 29 and 30 are provided with pins or rollers 33 and 34 which engage the eccentric grooves 23$^a$, 23$^b$, 24$^a$ and 24$^b$ formed in the cams 21 and 22 on opposite sides of said cams. The bars are slidably mounted on the frame 28 and carry mirrors arranged in angular relation to said bars, and to each other.

The mirrors carried by the bars 29 and 30 are preferably four in number, two of the mirrors being supported on the lower ends of the bars and two being supported on the upper ends of the bars. The lower mirrors 36 and 35 are secured to the bars 29 and 30 so that they occupy a position 45° to the vertical and are adapted to receive a horizontal light ray and deflect same to a vertical path. The upper mirrors 37 and 38 are secured to the bars 30 and 29 in an angular position of 45° to the vertical and are adapted to receive the light rays deflected to vertical paths by the lower mirrors 35 and 36 and to deflect said rays to a horizontal path.

When the mirrors 35—36 and 36—38 are at the greatest vertical distance apart, the distance between them equals one-half the height of an individual picture to be projected. One set of the mirrors, or mirrors 35 and 37, are adapted to completely reflect one individual image and mirrors 36 and 38 are adapted to reflect a second individual and complete image and each set of mirrors is adapted to be moved laterally by reason of the angular formation of the cams 21 and 22 and to be moved vertically by the concentric grooves formed in said cams.

The mirrors 36 and 35 are arranged to alternately and in rapid succession receive the images reflected from a photographic record 39 helically arranged upon a transparent cylinder 40. The record 39 may be formed of a tubular piece of material, transparent or non-transparent, such as paper, or may be mounted on a transparent cylinder 40 by winding a flexible transparent or non-transparent tape there-around, and the images carried by said record may be printed thereon by means of any of the well known printing processes or may be formed by means of the photographic positive process. The transparent cylinder 40 which is preferably formed of glass is provided at one of its ends with peripheral threads 41 which are arranged to engage with a rack bar 42 positioned on the base and parallel with the shaft 4. The transparent or glass cylinder 40 is mounted on the shaft 4, in such a manner that the cylinder may be moved horizontally on said shaft and will rotate with the shaft. This is accomplished by keying the transparent cylinder 40 to the shaft 4 by means of a feather key which will permit horizontal movement of the cylinder on said shaft and prevent radial movement of the cylinder on the shaft. The peripheral threads of the cylinder 40 are preferably formed on the inner end of said cylinder and arranged to make at least one complete revolution around the cylinder and are formed of a pitch to assure a positive engagement with the teeth of the rack bar 42.

The shaft 9 is provided with a suitable pulley and when driven by means of power connected to said pulley and rotated in the direction of the arrow A, will rotate the shaft 11 in the direction of the arrow B and by means of the gears 5, 6 and 7 will rotate the shaft 4 in the direction of the arrow C. Rotation of the shaft 11 in the direction of the arrow B will rotate the shaft 15 in the direction of the arrow D and rotate the shaft 18 in the direction of the arrow E. The rotation of the cylinder mounted on the shaft 4 in the direction of the arrow C will cause its inner side $40^a$ to move downwardly in relation to the base 1 and as it is moved downwardly and rotated in the direction of said arrow, the mirrors will be reciprocated in a vertical and in a lateral position by means of the cams 21 and 22 rotated on the shafts 11 and 18. The cylinder 40 is supported on the shaft 4 by means of a suitable disk or spokes 43 secured to the end provided with the peripheral threads and by a disk 44 formed with an opening 45 and provided with a sleeve 46 which is rotatably mounted on the shaft 4. The disk 44 is adapted to engage at its periphery the inner periphery of the transparent cylinder 40 which is rotatably supported on said disk and the opening in said disk is large enough to permit a strong ray of light to pass there-through.

The record 39 may be illuminated by means of a suitable lamp loosely mounted upon the sleeve 51 and arranged to project its rays accurately against at least two images on said record or the illuminating means may be positioned exteriorly of the cylinder 40 and arranged to project its rays by means of a concentrator on to a reflecting mirror positioned on the shaft 4 in such a manner that the rays passing through the opening 45 from the exteriorly positioned illuminating means will be reflected at right angles to the path of the projected rays and pass directly through the transparent cylinder 40 and at least two of the images formed on the record of said cylinder. The light rays passing through the cylinder 40 on a plane with the shaft 4 will be alternately and in rapid succession reflected by the mirrors carried by bars 29 and 30 from a horizontal plane to the vertical and again from the vertical to the horizontal and be finally received by a display screen 47 supported upon the base 1 by supports 48 and 49. As the light rays charged with the photographic images leave the upper mirrors, they pass through magnifying lenses 50 which enlarge the images reflected by the upper mirrors so that the images will occupy a greater space on the screen 47 than they have on the mirrors which are adapted to receive the images from the record 39 without any alteration in the size of said images.

The mirrors 35 and 37 are arranged to move together and to receive the light rays carrying the photographic images passing through the transparent cylinder 40 and to reflect said rays on the screen 47 without changing the position of the images upon said screen or vibrating the light rays reflected. As the transparent cylinder 40 will be rotated in a downward direction across the path of the light rays reflected through the cylinder 40 and the record 39 and as the cylinder 40 is thus rotated spirally by the shaft 4, the mirrors 35 and 37 will be brought into position to reflect one complete image and instantaneously with the completion of said image the mirrors 36 and 38 will be brought into position to reflect the following complete image, and instantaneously with the completion of the reflecting of the last mentioned image the first mentioned set of said mirrors will be returned to their original position to reflect a following complete image on the screen 47. In the present type of photographic machines for projecting continuous photographic images, the images are arranged in the order of their exposure on a transparent film which is frequently of great length and the film carrying continuous images is moved by special mechanism across the path of the illuminating rays which are intermittently broken by means of a shutter and the image is projected with the assistance of a magnifying lens upon a screen. The film moves through the operating mechanism and across the path of the projecting rays vertically with the result that the light rays are interrupted by the dark space or horizontal division between the various images and consequently the images appear with blurs and dark spots upon the screen. The images projected through the present machines follow each other on the screen in the order of the movement of the film and through the machine. If the film moves through the machine in the usual direction, which is downward, the images will follow each other on the screen in the same order. In my projecting apparatus, the images are arranged to follow each other as they are projected on the screen so that the boundary line between said images will pass from right to left and again from left to right, and continually so. In other words, the images by means of my machine follow each other laterally instead of vertically and are projected on the screen in such a manner that the light rays are not interrupted nor the images doubled upon themselves so as to produce a blurred or unclear appearance.

In Figs. 6 to 11 inclusive I have illustrated the various steps of the reflecting mirrors so as to clearly describe the exact manner in which succeeding images of the record 39 are reflected by means of said mirrors to a display screen. In Fig. 6, the mirrors 36 and 38 are shown in position to reflect the image a of the record 39. In this figure, the mirrors 35 and 37 are shown as occupying a position above the mirrors 36 and 38 equal to one-half the height of the image a which is being completely reflected by the mirrors 36 and 38. The two sets of mirrors are being moved in a downward direction by the bars 29 and 30 which have their respective ends disposed in oppositely arranged eccentric grooves of the cams 21 and 22, and are being moved in a lateral direction to the left by means of the angular formation of the shifting cams.

In Fig. 7, the image 2 is shown to cross from the mirror 36 to the mirror 35 which result is accomplished by the lateral shifting of said mirrors. When the mirrors are in the position shown in Fig. 7, the mirrors 35 and 37 reflect one-half of the picture b or the succeeding picture on the record 39. The mirrors are brought to the position shown in Fig. 7 by a one-eighth revolution of the cams 21 and 22. The mirrors 36 and 38 continue to move downward and to reflect the disappearing portion of the picture or image a and when the mirrors occupy the position shown in Fig. 7, the picture displayed on the screen is made up of the right half of the picture b and the left half of the picture a. In this position all four of the mirrors continue to move downward and toward the left and the mirrors 36 and 38 are at a distance below the mirrors 35 and 37 equal to one-half the height of one of the images.

In Fig. 8, all of the mirrors are shown to occupy their extreme left hand position and the complete image b is shown to be projected on the mirror 35 and by said mirror reflected with mirror 37 to the display screen. In the meantime, the image a has disappeared from the light path and is moving out of the field of view and the mirrors 36 and 38 are being elevated to their uppermost position, while the mirrors 35 and 37 are being lowered to their lowermost position, and all of the mirrors are held from lateral movement by means of the cams 21 and 22.

In Fig. 9, I have illustrated the mirrors 36 and 38 being moved from their uppermost position to their lowermost position and moved in lateral direction to the right so as to be brought into position to reflect the succeeding image c and the mirrors 35 and 37 being moved out of the reflecting position and being lowered to their lowermost position.

In Fig. 10, the mirrors 35 and 37 are below the mirrors 36 and 38 a distance equal to one-half the height of a single image and said mirrors are being moved in a lateral direction to the right and out of reflecting position, while the mirrors 36 and 38 are being moved into the reflecting position, the result being that the mirrors 35 and 37 will reflect one-half of the image $b$ and the mirrors 36 and 38 will reflect one-half of the image $c$.

In Fig. 11, I have illustrated the mirrors 35 and 37 in their lowermost position and being moved from said position to their uppermost position and being out of the reflecting position, while the mirrors 36 and 38 are being moved downwardly to their lowermost position from their uppermost position and are reflecting the complete image $c$. In all of the various movements of the reflecting mirrors, the central light ray charged with the continuous images is reflected to the display screen on a constant or unvarying plane with the result that the direction of said ray is held uniform and constant throughout the projection of the continuous images.

In Fig. 13 I have illustrated a detail view of one of the shifting cams showing the formation of the central grooves $24^a$. In the cam 22, the groove $24^a$ when formed for pictures one inch square approaches the center of the cam 22, three quarters of an inch from end to end and from $n$ to $o$ and $p$ to $n$ it recedes from the center at a uniform rate, three fourths of an inch to the starting point. Each of the cams is provided with a groove formed on opposite sides thereof and the groove $24^b$ of the cam 22 is arranged so that it recedes from the center three fourths of an inch from end to end and again approaches its center three fourths of an inch from $n$, $o$, $p$ and $m$. When the size of the picture is greater than one inch square, the area of the groove is correspondingly increased. The grooves $24^a$ and $23^a$ of the cams 22 and 21 will of course be varied in the development of the mechanical construction of the machines and it is understood that I am not limited to the exact curvature and arrangement of the cams which are particularly designed to provide simple and effective means for shifting the mirrors arranged to reflect the continuous images in a vertical and a lateral direction so that said mirrors will be successively brought to the reflecting position without interruption of the light rays passing through the record 39. The movement of the cylinder 40 carrying the record 39 will bring across the path of light in uniform order, the images of said record and this spiral feeding of the images of said record across the field of light will be followed by a compensatory movement of the reflecting mirrors. The reflecting mirrors are moved in a downward direction and into the reflecting position at a speed equal to exactly one-half the speed of the movement of the images in a downward direction across the path of light. As the images are reflected by means of the rapidly shifted reflecting mirrors, said images will follow each other laterally on the screen so that the boundary line between the adjoining images will alternately travel from right to left and from left to right.

The record 39 carrying continuous photographic images may be illuminated by means of a suitable lamp mounted on the shaft of the cylinder 40 interiorly thereof and provided with suitable heat absorbers for assuring the proper temperature of the cylinder and the record carried thereby. An illustration of the mounting of the illuminating means is given in Fig. 4. In this figure, the cylinder shaft is indicated by its numeral 4 and the disk 44 is shown mounted on the sleeve 51 within the cylinder 40. A sleeve 51 is keyed to the shaft 4 and a second sleeve 52 is mounted on the sleeve 51. The sleeve 52 is formed with a weighted arm 53 which connects with a laterally operating rod 54, said rod being arranged to extend through an opening formed in the disk 44 and provided with a suitable operating wheel 55. The operating rod 54 is positioned beneath and parallel with the shaft 4 and the illuminating means indicated by numeral 56 is suitably mounted on the sleeve 52 and the heat absorbing means indicated by numeral 57 is arranged to surround the illuminating means so as to prevent the heat of said illuminating means from radiating throughout the cylinder and detrimentally affecting the record 39. When it is desired to adjust the illuminating means with relation to the images carried by the record 39, the operating rod 54 may be extended within or without the cylinder 40 in a direction corresponding with the direction it is desired to adjust said means. The illuminating means is arranged to project its rays against at least two of the images continually and on a horizontal plane though it is evident by modifying the exact angular relation of the reflecting mirrors, said means may be arranged to project its rays on any desired plane.

An arrangement whereby the light is projected from exteriorly positioned illuminating means through the cylinder 40 and the images carried by the record is indicated by the Fig. 12. In this figure, the illuminating means 56 is suitably supported on the base 1 or positioned at a distant point and arranged to concentrate its rays so as to pass through the opening 45 in the disk 44 and reflect its rays on the reflecting mirror 58, said mirror being vertically supported on a sleeve 59 and arranged at an angle of 45° to the axis of shaft 4 so that the rays from the exteriorly positioned illuminating means 56 will be projected at right angles to the shaft 4. In this arrangement, the rays are arranged to pass through at least two of the images carried by the record 39. The light rays projected by the illuminating means 56 may be arranged in this modification to pass through the heat absorbers before entering the cylinder 40 so that said rays enter said cylinder at practically normal atmospheric temperature.

The record 39 as previously indicated may be formed of a tubular piece of material, transparent or non-transparent, and passed over the cylinder 40 in any suitable manner such as by releasing said cylinder from its mountings or said record may be formed by passing a sheet around said cylinder and securing same in place thereon or by helically winding the tape around said cylinder in the manner previously indicated. Should it be desired, the images may be printed on the record and the illuminating rays may be arranged to illuminate the outer side of said record instead of passing from within the cylinder and there-through. It is thought that this arrangement need not be illustrated as it simply involves the use of a powerful projecting lamp arranged to throw its rays from an exterior position upon the outer surface of the record 39.

The alternate projecting of the images of the record 39 by the rapidly shifted reflecting mirrors involves a steady uniform movement of said mirrors which may be arranged in angular positions previously indicated or in such angular positions as special conditions may require. The images of the record 39 are projected on the screen 47 without any jerking movement of said record and without any interval of darkness between the exposures of the successive pictures, every point on the screen being continually lighted.

It is evident that in order to produce a picture having a constant position on the screen 47, the movement of the reflecting mirrors should satisfy certain conditions, first the reflecting distance or the distance the light rays travel from the images to the screen must be constant, second, the light rays must be kept from a vibratory motion, third, the pictures must follow each other laterally on the screen 47 without confusion such as may be produced by doubling of the pictures upon themselves. All of the conditions are satisfied by the lateral and vertical movement of the shifted reflecting mirrors which are shifted by cams 21 and 22 in a manner to keep the reflecting mirrors in a true optical relation to the images to be projected, and the screen 47.

My invention may be applied to project continuous images fed by the usual film tapes and in the usual manner, or it may be made to pass the final ray of light, charged with the pictures, through one or more enlarging lenses directly to the eyes of a single observer. My invention may also be applied for taking picture records, in other words, it may be employed for the projection of developed pictures or may be used as a camera in photographic recording of objects. When the invention is employed as a camera, the mechanism is inclosed in a suitable light-tight box and operated in substantially the same manner as when projecting developed pictures. When the invention is used for a camera for taking rapidly moving objects, a shutter, however, will be necessary.

From the foregoing description, taken in connection with the accompanying drawings, the construction and operation of the invention will be readily understood without requiring a more extended explanation.

Various changes in the form, proportions, and the minor details of construction may be resorted to without departing from the principle or sacrificing any of the advantages of the invention as defined in the appended claims.

Having thus described and ascertained the nature of my invention what I claim as new and desire to secure by Letters-Patent is:

1. Means for projecting continuous photographic pictures comprising a transparent supporting body having a continuous picture record carried thereby, means for rapidly moving the supporting body, means for illuminating the predetermined portions of said picture record from the interior of the transparent supporting body, means for reflecting the projected picture, and means for rendering said reflecting means inoperative.

2. Means for projecting a continuous picture record comprising illuminating means arranged to illuminate two of the pictures continuously, a plural set of reflecting mirrors angularly disposed and arranged to alternately receive the pictures projected from the record, and means for moving the mirrors so that the pictures will be projected in rapid succession and in the order of their exposure upon the screen.

3. Means for reflecting continuous photographic pictures comprising a transparent supporting body, means for illuminating the pictures carried by the body and projecting said pictures in a horizontal direction, means for rapidly reflecting the pictures in a vertical direction in the order of their exposure, means for reflecting the pictures from the vertical to a horizontal direction and over a course parallel to the original direction of projection.

4. Means for feeding a continuous picture record, illuminating means arranged to illuminate two of the pictures continuously, a plural set of reflecting mirrors angularly disposed and arranged to alternately receive pictures projected from the record and means for moving the mirrors so that the pictures will be projected in rapid succession and in the order of their exposure upon a screen.

5. Means for projecting continuous photographic pictures comprising means for moving a continuous picture record, a plurality of angularly disposed mirrors, means for projecting pictures in a horizontal direction on to the mirrors in rapid succession, angularly disposed reflecting mirrors arranged to receive the reflected pictures from the first mentioned mirrors, means for moving one set of mirrors into the light path and the other set of mirrors out of the light path, and means for enlarging the pictures reflected by the mirrors.

6. Means for projecting a continuous picture record, comprising record feeding means, angularly disposed mirrors means for projecting the pictures of the record upon said angularly disposed mirrors, means for receiving the pictures from the mirrors and reflecting the same on a screen and means for operating the feeding means and the mirrors so that the pictures will be reflected on a screen in the order of their exposure and follow each other on the screen from opposite lateral directions, on said screen.

7. Means for projecting continuous pictures comprising means for feeding picture records an illuminating means, angularly disposed reflectors arranged to reflect the pictures on a screen and in the order of their exposure, and a plurality of cams for operating the reflectors and arranged to bring one set of the reflectors into line with the light path and the other set out of line with the light path.

8. Means for reflecting continuous photographic pictures comprising a plural set of reflecting mirrors arranged to reflect the pictures continuously in the order of their exposure so that the pictures will appear in consistent order on a screen, and a plurality of cams arranged to move the mirrors in a vertical and in a lateral direction, whereby each set of mirrors is moved into and out of the reflecting position.

9. Means for projecting a continuous picture record, comprising record feeding means, means for reflecting said pictures, means for causing the reflecting means to follow the pictures vertically, and to project said pictures laterally upon a screen, and means to render said reflecting means inoperative.

10. Means for projecting continuous pictures comprising rapidly shifting reflecting means, means to successively expose the pictures to said reflecting means, and a plurality of cams arranged to shift the reflecting means vertically and laterally across the light path.

11. Means for projecting continuous pictures comprising means for feeding picture records across a light path, means for illuminating a part of the pictures, angularly disposed reflectors arranged to receive the illuminated pictures, means for rapidly shifting the reflectors laterally comprising angularly formed cams, and means for shifting the reflectors vertically adapted to engage eccentric grooves formed in said cams.

12. Means for projecting continuous photographic pictures comprising a plurality of reflectors supported upon a movable bar and arranged in angular relation to each other, a second set of reflectors similarly arranged and similarly disposed, means for feeding a continuous picture record across the light path to said reflectors, means for alternately moving one set of reflectors into said light path and means for moving the other set of reflectors out of said light path.

13. Means for projecting continuous pictures comprising record feeding means, means for illuminating a portion of the record, angularly disposed reflecting means arranged to successively reflect the pictures from the picture feeding means in opposing lateral directions on a screen in the order of their exposure, cams for moving the reflecting means laterally in both directions, said cams being provided with eccentric grooves, means adapted to engage the eccentric grooves of the cams for moving said reflecting means vertically so that one picture will be reflected by one set of mirrors and another picture will be reflected by the second set of mirrors.

14. Means for projecting continuous photographic pictures comprising a frame slidably supported, a set of angularly disposed reflecting mirrors movably supported on said frame, a second set of angularly disposed reflecting mirrors movably supported on said frame, said sets being independently movable and each comprising a pair of connected mirrors arranged one above the other, a continuous picture record, means for projecting the pictures thereon upon the mirrors, means for moving the frame laterally, and means for moving the mirrors vertically.

15. Means for projecting continuous pictures comprising means for feeding a picture record, a frame slidably supported on standards, bars slidably supported on the frame, mirrors angularly disposed on the bars, angularly formed cams for shifting the mirrors and frame laterally, said cams being provided with eccentric grooves formed on opposite sides, and means adapted to engage the eccentric grooves for differently shifting the mirrors vertically.

16. Means for projecting continuous pictures comprising supporting means, a plural set of mirrors angularly disposed on the supporting means, means for successively lowering and elevating the mirrors, means for successively shifting the mirrors in alternate lateral directions, and means for projecting pictures upon the mirrors.

17. Means for projecting continuous pictures comprising supporting means, a set of angularly disposed mirrors, a second set of angularly disposed mirrors, each set of mirrors being arranged to successively reflect succeeding pictures, means for projecting pictures upon the mirrors, means for rapidly and successively moving each set of mirrors into and out of the reflecting position, and means for displaying the reflected pictures.

18. Means for projecting continuous photographic pictures comprising picture feeding means, reflector shifting cams formed with eccentric grooves arranged on their opposite sides, said cams being angularly formed so that the same may be supported diagonally upon a shaft with the edge of one-half thereof disposed on a plane substantially at right angles to said shaft, means for supporting the cams, reflector supporting means operated by the cams and adapted to receive a vertical and lateral movement, and reflectors carried by said supporting means whereby they will be moved into the path of the projected pictures.

19. In combination, a single source of light, means for dividing out the major portion of the heat rays from said source of light, means for feeding a picture record across the path of the light source, a set of angularly disposed reflectors rigidly united, means for movably supporting the reflectors so as to completely reflect individual pictures from the record, a second set of rigidly united reflectors parallel to the first set, means for moving each set of reflectors into the path of the light rays so as to reflect succeeding pictures from opposite reflectors, said means being adapted to move each set of reflectors out of the reflecting position simultaneously with the completion of the reflection of the complete picture.

20. In combination, a continuously moving support carrying a record having continuous pictures uniformly centered thereon so the outer edges of each picture will be in a line with the adjacent picture, a double set of united reflectors, and means for operating the reflectors so as to cause each set to successively occupy a reflecting position and a non-reflecting position, whereby individual pictures of the record are projected on a constant plane from said reflectors.

21. In combination, a continuously moving support carrying a record having continuous pictures uniformly centered thereon so that the outer edges of each picture will be in a line with the adjacent pictures, a double set of fixedly united reflectors for reflecting individual and complete pictures from the record, means for operating the reflectors so that each set will be moved to a reflecting position and to a non-reflecting position, and means for operating the support and reflectors in unison.

22. In combination, a continuously moving support carrying a continuous picture record, a compound reflector system for reflecting individual and complete pictures of the record, illuminating means for projecting predetermined portions of the record onto the reflector system, means for moving successive pictures of the record past the reflector system, and means for causing the reflector system to reflect individual and complete pictures from the record in the order of the movement of said images past the reflector system.

23. In combination, standards, a frame slidably supported on the standards, reflector supporting means slidable on the frame, means movable on the standards for simultaneously moving the frame and the reflector supporting means, reflectors arranged on the reflector supporting means, means for operating the movable means whereby the reflectors are moved laterally and vertically with relation to the standards, and means for moving a series of pictures past the reflectors.

24. In combination, standards, a frame slidably supported on the standards, bars slidably supported on the frame, reflectors angularly disposed on the bars, means for effecting a lateral movement in alternate directions of the frame and a vertical movement in alternate directions of the reflectors and the bars, and means for feeding a series of pictures past the reflectors.

25. In combination, standards formed with transverse openings, a frame formed with laterally extending pins slidably supported in the openings of the standards, bars having lateral arms formed thereon slidable on the frame, means for moving the frame on the standards, and the bars on the frame, angularly disposed reflectors movable with the bars, and means for feeding a continuous picture record past the reflectors.

26. In combination, standards, a frame horizontally slidable on the standards, bars vertically slidable on the frame, reflectors arranged on the bars, means for moving the frame horizontally in opposite directions and moving the bars and mirrors vertically in opposite directions, and means for feeding continuous photographic pictures past the reflectors.

27. In combination, supporting means, a frame slidably supported on the supporting means, bars vertically slidable on the frame, a double set of co-acting reflectors arranged on the bars, means for effecting a common lateral movement of the reflectors and simultaneously effecting a varying vertical movement of the reflectors, and means for feeding continuous photographic pictures past the reflectors.

28. In combination, supporting means, a frame horizontally slidable on the supporting means, a compound reflector system movable horizontally with the frame and movable vertically thereon, means for effecting a common horizontal movement of the reflectors and for effecting varying vertical movement of the reflectors, and means for feeding continuous photographic pictures past the reflectors and adapted to act with the reflector system operating means.

29. In combination, supporting means, a frame laterally slidable on the supporting means, a double set of angularly disposed reflectors vertically movable on the frame and adapted to laterally move therewith, means for moving the frame and the reflectors, and means for feeding continuous photographic pictures past the reflectors.

30. In combination, a supporting base, a shaft arranged on the supporting base, a cylinder arranged on the shaft, screw threads arranged on one end of the cylinder, a rack secured in a fixed position and adapted to be engaged by the screw threads whereby longitudinal movement of the cylinder is effected on the shaft, illuminating means supported on the shaft, adjustable means extending into the cylinder for varying the relation between the illuminating means and the cylinder.

31. In combination, a base, supporting means arranged on the base, a frame horizontally slidable on the supporting means, a bar vertically slidable on the frame, inwardly projecting follower arms formed on the ends of the bars, a double set of right angularly disposed mirrors fixed to the bars in adjacent positions, shafts, cams formed with eccentric grooves on their opposite sides, obliquely disposed on the shafts with portions of said cams occupying a right angular position with relation to said shafts, said follower arms being adapted to engage with the eccentric grooves of said cams, gearing for connecting the shafts, a cylinder supported on the cylinder base, means connected with the gearing for moving the cylinder radially, means for effecting longitudinal movement of the cylinder during the period of its radial movement, illuminating means arranged within the cylinder and adapted to project light rays therethrough, heat absorbing means for inclosing a portion of the illuminating means, and a record arranged on the cylinder provided with continuous photographic pictures adapted to allow the light rays to pass therethrough so that the pictures of said record will be projected onto the mirrors and reflected thereby.

32. In combination, supporting means, a frame, laterally slidable on the supporting means, bars vertically movable on the frame, arms formed on the bars provided with inwardly projecting follower pins, a plurality of longitudinally spaced cams adapted to engage the pins of the arms and to effect varying vertical movement of the arms, and reciprocating horizontal movement of the frame and the arms, and a plurality of angularly disposed mirrors arranged on the bars for the successive reflection of continuous pictures.

33. In combination, supporting means, a frame formed with laterally extending pins slidably projecting through the supporting means, bars vertically movable on the frame, arms formed on the ends of the bars having upwardly projecting follower pins, shafts arranged on the supporting means, a pair of cams formed with eccentric grooves adapted to be engaged by the follower pins for effecting different vertical movement of the bars and angularly disposed so as to effect a lateral movement of the bars and frame, a double set of mirrors angularly secured to the bars, means for operating the cams, and means for projecting continuous photographic pictures against the reflectors so that successive pictures are projected laterally upon a screen.

34. In a machine for projecting continuous photographic pictures, the combination with a record supporting device, a source of light arranged upon one side thereof, adapted to project the picture, means for rapidly reflecting the pictures projected from said record in a horizontal direction, means for reflecting the pictures into a vertical direction from said first reflecting means, and means for further reflecting the pictures into a horizontal direction to a screen, said last named reflecting direction being parallel to the projecting direction, and the rays of light being reflected in an opposite direction to the projected rays.

In testimony whereof I have hereunto set my hand in presence of two subscribing witnesses.

LOUIS LEON THURSTONE.

Witnesses:
C. FRED CRICE,
SAMUEL STROTH.